Patented May 6, 1952

2,595,341

UNITED STATES PATENT OFFICE 2,595,341

PREPARATION OF ALPHA-GLYCOL SULFURIC ESTERS

Robert A. Dinerstein, Park Forest, Ill., and Richard E. Van Strien, Hammond, Ind., assignors to Standard Oil Company, Chicago, Ill., a corporation of Indiana No Drawing. Application September 7, 1949, Serial No. 114,464

8 Claims. (Cl. 260—458)

This invention relates to a process for the preparation of alpha-glycol sulfuric esters. More particularly it relates to a unitary process for the preparation of alpha-glycol sulfates from certain mono-olefinic hydrocarbons, comprising the steps of converting said hydrocarbons to an alpha-glycol ester of a low molecular weight carboxylic acid followed by direct sulfation of the resultant alpha-glycol carboxylate.

Alpha-glycol sulfates have heretofore been prepared by a 3-step process from aliphatic mono-olefinic hydrocarbons, as follows: (1) conversion of the olefin to an alpha-glycol carboxylate of a low molecular weight aliphatic carboxylic acid; (2) saponification of the carboxylate produced by (1) to produce an alpha-glycol; (3) sulfation of the alpha-glycol produced in (2). (Note, for example, Adolf Grün, 2,138,917, patented December 6, 1938, and Daniel Swern et al., J. Am. Chem. Soc. 68, 1504 (1946).)

We have found that alpha-glycol sulfates can be prepared from mono-olefinic hydrocarbons without the necessity of effecting the second operation described in the paragraph above and that the resultant 2-step process affords substantial and unexpected advantages over the prior art 3-step process. Among these advantages are the elimination of the costly saponification step of the prior art, which normally involves refluxing the alpha-glycol carboxylate with alcoholic caustic, recovery of the alcohol and extraction of excess caustic from the alpha-glycol produced in the saponification step. When the saponification process of the prior art process is employed, it is usually necessary to deoil the alpha-glycol, for example by extraction with ether or similar solvents, following which an ether solution of the alpha-glycol is prepared and sulfated. We found that alpha-glycol carboxylates of low molecular weight ($C_1$—$C_4$) aliphatic mono-carboxylic acids are far more soluble in ether and similar solvents than the alpha-glycols and are more readily deoiled, i. e., separated from unconverted olefin, than alpha-glycols. Accordingly, it is possible to effect considerable economies in the sulfation step, since higher concentrations of charging stocks, viz, alpha-glycol carboxylate, are present which are substantially uncontaminated by unconverted olefin.

The mono-olefinic hydrocarbons employed in our process are carbon compounds containing the group

wherein the doubly bound carbon atoms are connected to at least one hydrogen atom or to an alkyl or alkylene (methylene or polymethylene) radical. By the term "alpha-glycol" we intend to define vicinal acyclic or alicyclic hydrocarbon diols.

Alpha-glycol carboxylates have usually been prepared by the reaction of aliphatic mono-olefinic hydrocarbons with hydrogen peroxide and a lower molecular weight carboxylic acid, such as formic, acetic, propionic, or butyric, particularly the first two members of the series. The preferred operation of the first step of the present invention involves the treatment of a mono-olefinic hydrocarbon, as defined above, with hydrogen peroxide and formic acid, which results in a facile conversion to produce the corresponding alpha-glycol mono- and di-formates (note, for example, Daniel Swern, J. Am. Chem. Soc. 69, 1692 (1947)). There are, however, other methods for the direct one-step conversion of mono-olefinic hydrocarbons to alpha-glycol carboxylates, for example, the treatment of said olefinic hydrocarbons with aliphatic $C_1$—$C_4$ percarboxylic acids in the presence of the corresponding free carboxylic acid, for example, the treatment of an aliphatic mono-olefinic hydrocarbon with a mixture of preformed peracetic acid and acetic acid. (Note, for example, the last cited Swern publication and W. J. Hickinbottom, "Nature," 159, 844 (June 21, 1947).) It is also known that the iodine catalyzed reaction of benzoyl peroxide, and presumably similar peroxides, with olefins forms alpha-glycol esters (note, for example, A. Perret et al., Helvetica Chimica Acta. 28, 558 (May 2, 1945); C. A. 40, 1480).

A wide variety of mono-olefinic hydrocarbons is available for employment in the process of the present invention to produce alpha-glycol sulfates. Thus, we may employ as the charging stock, ethylene or secondary or tertiary mono-olefins, either acyclic or cycloaliphatic. By way of illustration, we may employ as starting materials such mono-olefinic hydrocarbons as ethylene, propylene, 1-butane, 2-butane, isobutylene, 1-pentene, 2-pentene, 2-methyl-2-pentene, 2-hexene, 3-hexene, 3-heptene, 1-octene, diisobutylene, isobutylene-n-butylene codimers, various nonenes, 1-decene, 2-decene, 1-dodecene, 1-tridecene, pentadecenes, 1-hexadecene, 1-octadecene, cyclobutene, cyclopentene, 1-methylcyclopentene, cyclohexene, 1-methylcyclohexene, cycloheptene, endomethylene cyclohexene (bicyclo [2,2,1] heptene), 2-methyl-bicyclo [2,2,1] heptene, styrene, stilbene, vinylcyclohexane, and the like.

However, for the preparation of alpha-glycol sulfates of primary interest (e. g., in the form of sodium, potassium, or alkyl-ammonium salts)

as detergents and textile assistants, the preferred olefins are the straight-chain or slightly branched-chain aliphatic mono-olefinic hydrocarbons containing from 8 to 18 carbon atoms, inclusive, in the molecule and containg the olefinic double bond in the 1,2- or 3,4-position. The $C_{14}$ alpha-glycol sulfates constitute optimum detergents. Suitable olefinic hydrocarbons for the preparation of detergent alpha-glycol sulfates can readily be obtained from the HCS (hydrocarbon synthesis) process, which involves the treatment of carbon monoxide and hydrogen in a substantially equimolar ratio with alkalized iron catalysts at temperatures between about 450 and 700° F. and pressures between about 200 and 500 p. s. i. g. Suitable olefinic materials for use in the preparation of detergent alpha-glycol sulfates may also be derived from the catalytic dehydration of the essentially straight-chain terminal alcohols in the $C_8$—$C_{18}$ range produced by the so-called Synol process, which is a modified HCS process employing a highly active iron catalyst at temperatures between about 180 and 200° C. and pressures of 18 to 30 atmospheres (B. H. Weil and J. C. Lane, "Synthetic Petroleum from the Synthine Process," Chemical Publishing Co., 1948, pp. 154 and 273). Other olefinic charging stocks may be prepared by thermal or catalytic polymerization of aliphatic or mono-olefinic hydrocarbons containing less than 8 carbon atoms per molecule, by catalytic dehydrohalogenation of various alkyl halides, etc.

As has been mentioned above, the preferred operation to obtain an alpha-glycol carboxylate is to treat an olefin with hydrogen peroxide and formic or acetic acids. The interaction of hydrogen peroxide and the carboxylic acid apparently produces the corresponding percarboxylic acid in situ, and the resultant mixture of carboxylic acid and percarboxylic acid reacts with the olefin to produce the alpha-glycol carboxylate. Usually the stoichiometric or somewhat larger quantity, up to about 25 mol percent excess, of hydrogen peroxide and carboxylic acid are contacted with the olefinic starting material at temperatures between about 20 and about 60° C. for a period of time sufficient to produce a substantial yield of the desired alpha-glycol carboxylate, for example, between about 3 and about 50 hours, usually about 8 to about 24 hours. Various olefins react at various rates and, furthermore, acetic, propionic, and butyric acids react somewhat more slowly than formic acid, which is the preferred acid for the practice of the first step of the process of this invention.

Following conversion of the olefin to an alpha-glycol carboxylate, the reaction mixture may be treated for the removal of unconverted olefin. Thus, the unconverted olefin and alpha-glycol carboxylate can usually be separated by distillation, preferably under vacuum. However, other methods, such as selective solvent extraction, may also be practiced. It is not in all instances essential to separate unconverted olefin from alpha-glycol carboxylate, and, in the event that no separation is made, unconverted olefin will be converted in the sulfation operation to an alkyl sulfate and, under certain sulfating conditions, to hydroxyalkyl sulfates, which have desirable wetting and detergent properties.

The alpha-glycol carboxylates produced in the first step of the process of this invention can be sulfated with chlorosulfonic acid or other well-known sulfating agents, such as concentrated, for example 96 weight percent, sulfuric acid, sulfuric acid monohydrate, various fuming sulfuric acids, and the like. Sulfation is usually effected by treating the alpha-glycol carboxylate with a sulfating reagent at least in the amount of one mol per mol of carboxylate, in one or more sulfating stages. However, the employment of a slight excess of sulfating reagent, for example up to about 1.5 mol per mol of alpha-glycol carboxylate, is not excluded. Sulfation is ordinarily effected at temperatures between about 0 and about 40° C. The alpha-glycol sulfate produced as a result of the second step operation may be neutralized to produce sodium, potassium, ammonium, alkylammonium or other salts.

The $C_8$—$C_{18}$ alpha-glycol sulfates of the alkali metals and ammonium compounds are possessed of commercially attractive wetting, detergent, and textile assisting properties.

The following examples are intended to illustrate but not unduly to limit the scope of our invention.

*Example 1*

A mixture of 60 g. of 1-hexadecene, 36 g. of 27 weight percent $H_2O_2$, and 300 g. of 98–100 weight percent formic acid is stirred at 46° C. for twenty-four hours, and excess formic acid is stripped from the reaction mixture under vacuum. The product is 67 g. of an oil $$\left(d\frac{20}{4}, \ 0.87\right)$$

which is distilled under vacuum to separate 35 ml. of unreacted olefin (40 percent on feed) as distillate. The residue is 40 g. of an oil $$\left(d\frac{20}{4}, \ 0.94\right)$$

which crystallizes on standing. The crystalline product is 1,2-hexadecene glycol formate, having a saponification number of 207, and containing 17.58 percent of oxygen, indicating that the ester product is actually about a 50–50 mixture of mono- and diformates. The yield of ester is 83 percent, based on consumed olefin. The unconverted olefin derived from the distillation step can be recycled for further treatment with hydrogen peroxide and formic acid. The alpha-glycol formate (21 g.) is dissolved in 100 ml. of diethyl ether, and chlorosulfonic acid is added in the amount (9 g.) calculated to be necessary to react with one hydroxyl group in the ester. The ester is cooled by an ice-water bath to a temperature of 0 to 5° C., and the chlorosulfonic acid is added over the course of 20 minutes to the carboxylate in order to prevent undue temperature rise in the reaction mixture. The resulting alpha-glycol surfuric ester is neutralized with aqueous sodium hydroxide to yield 14 grams of the sodium alpha-glycol sulfate; 11 grams of unreacted 1,2-hexadecanediol is also recovered. Analysis of the glycol sulfate shows it to contain 9.91% sulfur, corresponding to a composition of 80% sodium alpha-glycol sulfate and 20% of the disodium glycol disulfate. The yield of sodium alpha-glycol sulfate produced in the above 2-step process compares favorably with the yield of 8 grams of the sodium salt from sulfation of 20 g. of the diol, wherein 700 ml. of diethyl ether is required to dissolve the diol. The detergent properties of the two sodium salts are equivalent.

*Example 2*

A 15-carbon atom fraction of HCS product boiling in the range of 253–273° C. and analyzing 2.2 percent oxygen is heated with 15 weight percent of barium oxide at 220° C. for 4 hours and distilled at reduced pressure to obtain a product analyzing 0.86 percent oxygen. A 268 gram portion of this product is treated with 1000 grams of 85 percent formic acid and 275 grams of 27 percent hydrogen peroxide at 50° C. for 27 hours. Thereafter, the formic acid is removed as a distillate from the reaction mixture under vacuum and 109 grams of unreacted olefin fraction is also recovered as a distillate leaving 123 grams of a mixture of mono- and di-formates of the alpha-glycol of the olefinic feed stock, being a yield of 76 percent based on consumed olefin. The mixture of glycol formates (48 grams) is dissolved in 200 ml. of diethyl ether and 21 grams of chlorosulfonic acid is added to the resultant solution while maintaining the temperature between 0 and 10° C. The resultant glycol sulfuric ester is neutralized with sodium hydroxide solution, yielding 29 grams of the sodium alpha-glycol sulfate and 20 grams of recovered alpha-glycol of the 15-carbon atom olefinic charging stock.

*Example 3*

A mixture of 41 grams of cyclohexene, 200 grams of 90 percent formic acid and 70 grams of 30 percent hydrogen peroxide are stirred for 14 hours at 40° C. Formic acid is then stripped from the reaction mixture under vacuum and the mixture is distilled to yield 4 grams of recovered cyclohexene and 63 grams of a mixture of mono- and di-formates of 1,2-cyclohexanediol, being a yield of 80 percent, based on consumed cyclohexene. A mixture of cyclohexene-alpha-glycol formates (29 grams) is dissolved in 200 ml. of diethyl ether and 23 grams of chlorosulfonic acid is added slowly thereto while maintaining the temperature between 0 and 10° C. The sulfation reaction mixture is neutralized with aqueous sodium hydroxide to yield 1,2-cyclohexanediol sodium sulfate (18 grams) and recovered 1,2-cyclohexanediol (10 grams).

It will be noted from the foregoing examples that a concomitant product of the sulfation step is a hydrocarbon diol. In the preferred commercial operation of out invention the diol is separated from the alpha-glycol sulfate, usually by distillation and recycled to the sulfation operation, which is accordingly conducted upon a mixture of alpha-glycol carboxylate and alpha-diol, thus increasing the ultimate yield of alpha-glycol sulfate derivable from the process of our invention while avoiding the necessity of the prior art saponification procedure.

The alpha-glycol sulfates of the present invention may be employed in compounding washing, wetting or detergent compositions, e. g. with alkaryl sulfonates, non-ionic detergents such as polyethylene oxide condensation products of alcohols, phenols or mercaptans, with alkyl sulfate detergents, and the like.

Having thus described our invention, what we claim is:

1. A process for the preparation of an alpha-glycol sulfuric ester, which process comprises treating an alpha-glycol ester of a fatty acid containing 1 to 4 carbon atoms, inclusive, per molecule with a sulfating reagent under sulfating reaction conditions.

2. The process of claim 1 wherein the sulfating reagent is a strong sulfuric acid and the sulfation temperature is between about 0° C. and about 40° C.

3. The process of claim 1 wherein the sulfating reagent is strong sulfuric acid employed in an amount between about 1 and about 1.5 mols per mol of said alpha-glycol ester of a fatty acid and the sulfation reaction temperature is between about 0° C. and about 40° C.

4. The process of claim 1 wherein the sulfating reagent is chlorosulfonic acid and the sulfation temperature is between about 0° C. and about 40° C.

5. The process of claim 1 wherein said alpha-glycol ester of a fatty acid is an alpha-glycol formate.

6. The process of claim 1 wherein said alpha-glycol ester of a fatty acid is an alpha-glycol acetate.

7. A process for the preparation of an alpha-glycol sulfuric ester, which process comprises treating a diethyl ether solution of an alpha-glycol ester of a fatty acid containing 1 to 4 carbon atoms, inclusive, per molecule with a sulfating reagent under sulfating reaction conditions.

8. A process for the preparation of an alpha-glycol sulfuric ester, which process comprises treating an alpha-glycol ester, prepared by treatment of an monoolefinic hydrocarbon wherein the doubly bound carbon atoms are joined to at least one constituent selected from the class consisting of hydrogen, an alkyl radical and alkaline radical with hydrogen peroxide and a fatty acid containing 1 to 4 carbon atoms, inclusive, per molecule with a sulfating reagent under sulfating reaction conditions.

ROBERT A. DINERSTEIN.
RICHARD E. VAN STRIEN.

REFERENCES CITED

The following references are of record in the file of this patent:

UNITED STATES PATENTS

| Number | Name | Date |
|---|---|---|
| 2,006,734 | Edlund et al. | July 2, 1935 |
| 2,192,721 | Toone | Mar. 5, 1940 |

FOREIGN PATENTS

| Number | Country | Date |
|---|---|---|
| 499,144 | Great Britain | Jan. 16, 1939 |